US008719915B2

(12) United States Patent
Lu et al.

(10) Patent No.: US 8,719,915 B2
(45) Date of Patent: *May 6, 2014

(54) METHOD FOR IMPROVING NETWORK APPLICATION SECURITY AND THE SYSTEM THEREOF

(75) Inventors: Zhou Lu, Beijing (CN); Huazhang Yu, Beijing (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 311 days.

This patent is subject to a terminal disclaimer.

(21) Appl. No.: 12/808,166

(22) PCT Filed: Mar. 18, 2010

(86) PCT No.: PCT/CN2010/071132
§ 371 (c)(1),
(2), (4) Date: Jun. 14, 2010

(87) PCT Pub. No.: WO2010/139203
PCT Pub. Date: Dec. 9, 2010

(65) Prior Publication Data
US 2011/0119750 A1  May 19, 2011

(30) Foreign Application Priority Data

May 31, 2009 (CN) .......................... 2009 1 0086340

(51) Int. Cl.
*G06F 17/00* (2006.01)
*G06F 21/00* (2013.01)
(52) U.S. Cl.
CPC ..................................... *G06F 21/00* (2013.01)
USPC ............................. 726/12; 713/151; 713/176
(58) Field of Classification Search
CPC .................................................... G06F 21/00
USPC ......................................................... 726/12
See application file for complete search history.

(56) References Cited

U.S. PATENT DOCUMENTS

2003/0177392 A1\* 9/2003 Hiltgen ......................... 713/201
2005/0172131 A1\* 8/2005 Nakayama et al. ........... 713/176
(Continued)

OTHER PUBLICATIONS

Ravi Chandra Jammalamadaka; Timothy W. van der Horst; Sharad Mehrotra; Kent E. Seamons; Nalini Venkasubramanian; , "Delegate: A Proxy Based Architecture for Secure Website Access from an Untrusted Machine," Computer Security Applications Conference, 2006. ACSAC '06. 22nd Annual , vol., no., pp. 57-66, Dec. 2006.\*

(Continued)

*Primary Examiner* — Carl Colin
*Assistant Examiner* — Syed Zaidi
(74) *Attorney, Agent, or Firm* — Bright IP Law Offices

(57) ABSTRACT

A method for improving network application security and the system thereof are disclosed in the invention, relating to the field of information security. The method includes: a proxy server in a customer terminal host receives a protocol message, generated and sent by the customer terminal software according to the information input by a user, and obtains the protocol content after parsing the protocol message, and determines whether critical information is included in the protocol content, if it is, the server sends the protocol content to the smart key device; and the smart key device obtains the critical information by parsing it and sends it to the user, and after a confirmation information is gotten from the user, the smart key device signs the protocol content and sends the signature result to the server; and then the server generates a new protocol message to an application server according to the signature result and the protocol content; after an error confirmation or no confirmation is received within a predetermined time period by the user, the smart key device performs the exception handling. The system includes a smart key device and a proxy server in the customer terminal host. The invention improves network application security on the premise of no change to the customer terminal, and it is usable and compatible.

13 Claims, 2 Drawing Sheets

(56) References Cited

U.S. PATENT DOCUMENTS

| | | | |
|---|---|---|---|
| 2006/0083228 A1* | 4/2006 | Ong et al. | 370/389 |
| 2006/0168653 A1* | 7/2006 | Contrera | 726/9 |
| 2007/0011066 A1* | 1/2007 | Steeves | 705/35 |
| 2007/0150419 A1* | 6/2007 | Kozlay | 705/67 |
| 2007/0204334 A1* | 8/2007 | Lu et al. | 726/9 |
| 2008/0059804 A1* | 3/2008 | Shah et al. | 713/186 |
| 2008/0110983 A1* | 5/2008 | Ashfield | 235/382 |
| 2008/0294902 A1* | 11/2008 | Lu et al. | 713/176 |
| 2009/0006418 A1 | 1/2009 | O'Malley | |
| 2009/0070691 A1* | 3/2009 | Jain | 715/760 |
| 2010/0125729 A1* | 5/2010 | Baentsch et al. | 713/151 |
| 2010/0199086 A1* | 8/2010 | Kuang et al. | 713/155 |

OTHER PUBLICATIONS

Vassilev, A.T.; du Castel, B.; Ali, A.M.; , "Personal Brokerage of Web Service Access," Security & Privacy, IEEE , vol. 5, No. 5, pp. 24-31, Sep.-Oct. 2007.*

Dawei Zhang; Peng Hu;, "Trusted e-commerce user agent based on USB Key", Proceedings of the International MultiConference of Engineers and Computer Scientists 2008 vol. I, IMECS 2008, Mar. 19-21, 2008, Hong Kong.*

T. Weigold et al., "The Zurich Trusted Information Channel-An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.*

* cited by examiner

METHOD FOR IMPROVING NETWORK APPLICATION SECURITY AND THE SYSTEM THEREOF

FIELD OF THE INVENTION

The invention relates to the field of information security, in particular to a method for improving network application security and the system thereof.

BACKGROUND OF THE INVENTION

With the rapid development of network, people rely on network more and more. Online bank, online shopping and etc, have been popular in people's life. However, incidents from a hacker attacking and stealing the password of a valid user and making illegal trade occur more frequently, which makes a great loss. People are more worried about security of network when enjoying its convenience and speed, and therefore the identification authenticating technology becomes more and more important. So far, the identification authenticating technology has been widely used in all fields, mainly in online bank, governmental website, Browser/Server framed Enterprises Resource Planning (ERP) as well as fields requiring more security assurance.

Currently, many methods for improving security of network have been provided, including the digital signature technology that is downloading and installing a digital certificate in the customer terminal, or for safer, using a USB Key (Universal Serial BUS Key) and the like, to sign data transferred online, but a risk coming along with it is that data need to be signed in the USB Key is still sent to the host by the customer terminal.

Moreover, the existed methods for improving security of network are too difficult to be used, in details is that, in order to complete a signature operation, more plugs and software relating to the smart key device need to be installed, and most of the plugs in the present program is developed for IE kernel, while unsupportable to explorer such as Firefox, which results in a communication problem by part of users on network.

In sum, disadvantages in the present methods for protecting security of network are difficult to operate, uncompatible, unsafe.

SUMMARY OF THE INVENTION

For eliminating the problems in the prior art, a method for improving network application security is provided in the invention. The solution is described as below.

A method for improving network application security, comprising:

the proxy server in a customer terminal host receiving a protocol message generated and sent by customer terminal software according to the information input by a user, and parsing the protocol message according to a predetermined protocol, and obtaining protocol content; and the proxy server determining whether critical information, which is predetermined by the proxy server, the smart key device and the application server, is included in the protocol content;

if the critical information is included in the protocol content, the proxy server sending the protocol content to the smart key device and the smart key device parsing the protocol content to obtain the critical information, and outputting the critical information for user's confirmation; and if a signal indicating that the critical information is confirmed correct by the user is received, the smart key device signing the protocol content and returning a signature result to the proxy server, and then the proxy server generating a new protocol message according to the signature result and the protocol content, and sending it to the application server; or if a signal that the critical information is confirmed as incorrect by the user is received by the smart key device or no confirmation signal from the user is received by the smart key device within a predetermined time period, the smart key device performing an exception handling;

if the critical information is not included in the protocol content, the proxy server sending the protocol message to the application server.

The step of the proxy server determining whether critical information, which is predetermined by the proxy server, the smart key device and the application server, is included in the protocol content, further comprises:

the proxy server finding the field predefined by the proxy server, the smart key device and the application server, in the protocol content, determining whether there is data in the field, if there is, it determining that the critical information is included in the protocol content; or the proxy server determining whether a critical information identification, predetermined by the proxy server, the smart key device and the application server, is included in the protocol content, if it is, the proxy server determining that the critical information is included in the protocol content.

Both the protocol message and the new protocol message comprise a requirement head field, in which the address of the application server is recorded.

The step of the proxy server sending the protocol content to the smart key device further comprises: the proxy server parsing the requirement head field of the protocol message and determining whether the address of the application server in the requirement head field matches with that stored in the proxy server, if it does, the proxy server sending the protocol content to the smart key device; otherwise, the proxy server prompting the user of an error in the application server, and the procedure being completed.

The step of the smart key device parsing the protocol content and obtaining the critical information in the protocol content, further comprises:

the smart key device obtaining the field predefined by the proxy server, the smart key device and the application server, in the protocol content, and determining whether there is data in the field, if there is, the smart key device reading the data and obtaining the critical information; or the smart key device determining whether a critical information identification predetermined by the proxy server, the smart key device and the application server, is included in the protocol content, if it is, the smart key device obtaining the critical information with the critical information identification.

The step of outputting the critical information for user's confirmation further comprises: the smart key device outputting the critical information for user's confirmation by a LCD display or voice broadcast.

The step of the smart key device performing an exception handling further comprises: the smart key device notifying the proxy server of stopping all operations and prompting the user of an operation failure; or the smart key device returning a fault signature result to the proxy server.

The step of the smart key device signing the protocol content further comprises: the smart key device authenticating a user's identification according to his personal identification code or personal biometrics, wherein, the personal biometrics comprise fingerprints, iris or vein identification; and signing the protocol content after a successful authentication or refusing to sign the protocol content after a authentication failure.

The step of the proxy server generating a new protocol message according to the signature result and the protocol content, further comprises:

the proxy server inserting the received signature result to the protocol content and obtaining a new protocol content, and adding a requirement head field to the new protocol content to obtain a new protocol message; or the proxy server replacing the designated part of the protocol content with the received signature result to obtain a new protocol content, adding a requirement head field to the new protocol content and obtaining a new protocol message.

The predetermined protocol comprises the Hypertext Transfer Protocol and/or the Hypertext Transfer Protocol over Secure Socket Layer.

A system for improving network application security, wherein the system comprising a smart key device and a proxy server installed in the customer terminal host;

wherein, the proxy server comprises:

a first interface module for receiving a protocol message generated and sent by the customer terminal software according to information input by a user; and for communicating with the smart key device, and for sending a protocol content to the smart key device, and for receiving a signature result from the smart key device and sending a new protocol message to the application server;

a parsing module for parsing the protocol message received by the first interface module and obtaining the protocol content;

a determining module for determining whether a critical information, predetermined by the proxy server, the smart key device and the application server, is included in the protocol content gotten by the parsing module, if it is, sending the protocol content to the smart key device with the first interface module; otherwise sending the protocol to the application server with the first interface module; and a message generating module for generating a new protocol message with the signature result received by the first interface module and the protocol content gotten by the parsing module, and for sending the new protocol message to the application server with the first interface module;

the smart key device comprises:

a second interface module for communicating with the proxy server and receiving the protocol content sent by the proxy server, and for sending the signature result to the proxy server;

a filtering module for parsing the protocol content received by the second interface module and obtaining the critical information;

an outputting module for outputting the critical information gotten by the filtering module for user's confirmation;

a confirmation module for receiving the confirmation signal, of whether the critical information is correct or not, input by the user;

a signature module for signing the protocol content received by the second interface module while the signal received by the confirmation module is confirmed correct by the user, and for returning the signature result to the proxy server with the second interface module of the smart key device; and an exception handling module for making exception handling if the signal received by the confirmation module is a signal confirmed incorrect by the user, or the signal sent by the user is not received by the confirmation module within a predetermined time period.

The determining module further comprises:

a first determining unit for finding the field predetermined by the proxy server, the smart key device and the application server, in the protocol content received by the parsing module, and for determining whether there is data in the field or not, if there is, determining the critical information is included in the protocol content and sending the protocol content to the smart key device with the first interface module; otherwise, determining the critical information is not included in the protocol content and sending the protocol message to the application server with the first interface module; or a second determining unit for determining whether the critical information identification, predetermined by the proxy server, the smart key device and the application server, is included in the protocol content received by the parsing module, if it is, determining the critical information is included in the protocol content and sending the protocol content to the smart key device with the first interface module; otherwise, determining the critical information is not included in the protocol content and sending the protocol message to the application server with the first interface module.

Both the protocol message and the new protocol message further comprise the requirement head field in which an address of the application server is recorded, and the determining module further comprises:

a determining unit for determining whether the critical information, predetermined by the proxy server, the smart key device and the application server, is included in the protocol content gotten by the parsing module;

a first processing unit for parsing the requirement head field in the protocol message received by the first interface module of the proxy server if the determining module determines that the critical information is included in the protocol content, and for determining whether the address of the application server recorded in the requirement head field matches with that stored in the proxy server, if it does, sending the protocol content to the smart key device with the first interface module of the proxy server; otherwise, prompting the user of an error in the application server; and a second processing unit for sending the protocol message to the application server with the first interface module after the determining module determining that the critical information is not included in the protocol content.

The filtering module further comprises:

a first filtering unit for finding the field predetermined by the proxy server, the smart key device and the application server, in the protocol content received by the second interface module of the smart key device, and for determining whether there is data in the field, if there is, reading the data and obtaining the critical information; or a second filtering unit for determining whether a critical information identification predetermined by the proxy server, the smart key device and the application server, is included in the protocol content received by the second interface module of the smart key device, if it is, obtaining the critical information according to the critical information identification.

The outputting module is a LCD display or an audio device.

The exception handling module further comprises: a first exception handling unit for notifying the proxy server of stopping all operations and prompting the user of a failure after the information received by confirmation module is an information that the user confirms the critical information incorrect, or the confirmation information from the user is not received by the confirmation module within a predetermined time period; or a second exception handling unit for returning a fault signature result to the proxy server with the second interface module of the smart key device.

The signature module of the smart key device further comprises: a signature unit for authenticating the user's identification by his personal identification code or personal biometrics which include fingerprints, iris or vein, if the signal received by the confirmation module is a signal that the user confirms the critical information correct, and for signing the protocol content and returning the signature result to the proxy server with the second interface module of the smart key device after a successful authentication; or for refusing to sign the protocol content after a failed authentication.

The message generating module of the proxy server further comprises a first generating unit for inserting the signature result, received by the first interface module of the proxy server, to the protocol content and obtaining new protocol content, and for adding a requirement head field to the new protocol content and obtaining a new protocol message, and for sending the new protocol message to the application server with the first interface module; or a second generating unit for replacing the signature result, received by the first interface module of the proxy server, with the designated part of the protocol content and obtaining new protocol content, and for adding a requirement head field to the new protocol content and obtaining a new protocol message, and for sending the new protocol message to the application server with the first interface module.

The solution provided in the embodiments of the invention is executed by determining whether the critical information is included in the protocol message with a proxy server of the customer terminal server, if it is, the smart key device signs the protocol content and returns the signature result to the proxy server, and the proxy server generates a new protocol message to the application server according to the signature result, which improves security of network on the premise of no change to the customer terminal, usable and compatible.

DETAILED DESCRIPTION OF THE PREFERRED EMBODIMENTS

For clear description of the purpose, solutions and advantages of the invention, a further description of the embodiments of the invention will be given in combination with the drawings as below.

A method for improving network application security is provided in the embodiment of the invention, including:

a proxy server in a customer terminal host receives protocol message generated and sent by customer terminal software according to the information input by a user, and parses the protocol message and obtains the protocol content according to a predetermined protocol; and the proxy server determines whether a critical information, predetermined by the proxy server, the smart key device and the application server, is included in the protocol content; if critical information is included in the protocol content, the proxy server sends the protocol content to the smart key device; and the smart key device obtains the critical information by parsing the protocol content after receiving it, and outputs the critical information to the user for confirmation, and after a successful confirmation to the critical information is gotten from the user, the smart key device signs the protocol content and sends the signature result to the proxy server; and the proxy server generates a new protocol message with the signature result and the protocol content, and sends the new protocol message to an application server; after an error confirmation or an unconfirmation within a predetermined time period by the user, the smart key device performs the exception handling; if critical information is not included in the protocol content, the proxy server sends the protocol message to the application server.

The proxy server in the embodiments of the invention is not a server between a customer terminal and a Web server, but software in the customer terminal host, responsible for the information transmission between a customer terminal and a Web server. The proxy server has it's own IP address which can be generated automatically when installing the proxy server software, or be setup by a user. Also the proxy server has functions of storing, parsing and filtering a message. When a customer terminal is connected to a website and obtains online information with an explorer, it sends a requirement to the proxy server, and the proxy server forwards (or transmit) the requirement to the designated web server and receives information returned by the designated web server and forwards it to the explorer of the customer terminal. In brief, the proxy server in the embodiments of the invention is software in the customer terminal.

The application server in the embodiments of the invention refers to the designated web server served by the customer terminal, including many types, such as electronic business system server, online bank system server and etc.

Embodiment 1

Figure 1:
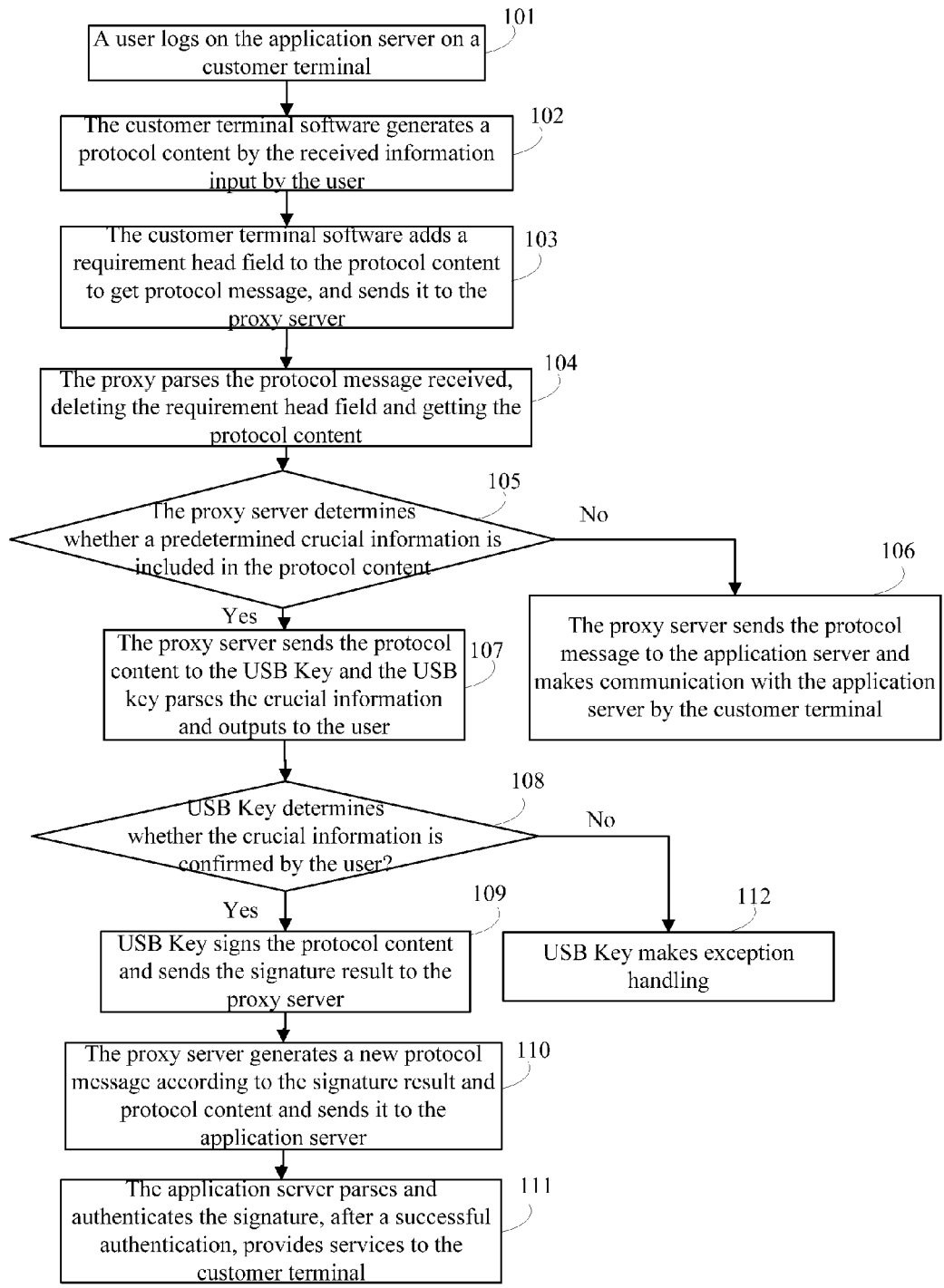
FIG. 1 is a flow chart of the method for improving network application security in embodiment 1 according to the present invention.
Figure 2:
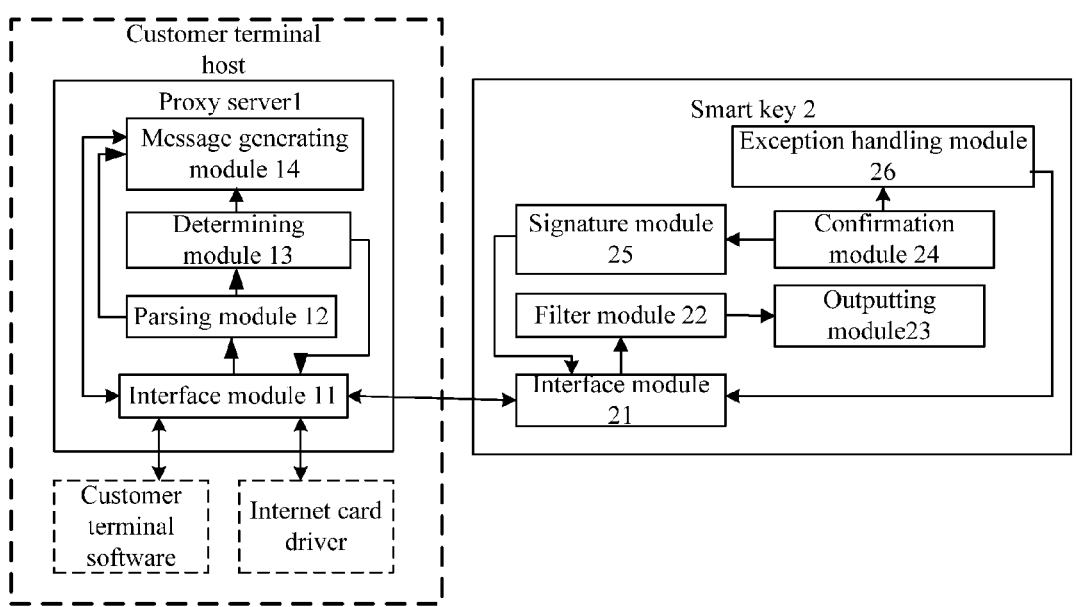
FIG. 2 is a structural chart of the system for improving network application security in embodiment 2 according to the present invention.

A method for improving network application security is provided in the embodiment, referring to FIG. 1, including steps as below.

Step 101: a user logs on the application server by customer terminal and an example is taken that a user inputs log-on related information when logging on an online bank in the embodiment.

In the step, the user can visit an online bank by customer terminal software such as an IE or others in the system, in details is that before the visit, a setting is made to the proxy server in the operation system, such as allocating an IP address for the proxy server, and then all visits to the internet are completed by the proxy server, rather than is designated to the destination directly.

The above-mentioned proxy server can be stored in a smart key device, such as in an USB key in the embodiment, and when the USB key is connected to the customer terminal, it automatically runs and installs the proxy server software in the customer terminal without user's further operation.

For example, the IP address of the customer terminal is 192.168.1.22, and a proxy server is installed in the customer terminal with address of 219.168.0.1, and if a user logs on the online banksystem with the customer terminal host, the application server's IP address of the online banksystem is 202.168.0.1.

Step 102: the customer terminal software receives the information input by the user and, generates a protocol content according to the information. And the protocol content is related to the protocol currently used. In the embodiment, the protocol used in the communication between the customer terminal and the application server can be Hypertext Transfer Protocol and/or Hypertext Transfer Protocol over Secure Socket Layer, and critical information can be predetermined by the customer terminal, the smart key device and the application server, which is a basic information for user's confirmation, such as taking the important information used in an online trade as critical information for user's confirmation.

For determining and obtaining the critical information, critical information identification can be added to the protocol content for identifying the critical information input by the user, which can be predetermined by the smart key device, the application server and the proxy server. In the embodiment, an example is taken of a user transferring on the online bank for explaining the protocol content generated by the customer terminal. Below is a protocol content in XML format.

In the above example, because there is not a signature value in the protocol content, value in the field of <SignatureData></SignatureData> is blank.

Step 103: the customer terminal software adds a requirement head field to the protocol content according to a predetermined protocol and obtains a protocol message, and sends it to the proxy server.

In the embodiment, the predetermined protocol can be http and/or https or others. There are many requirement head fields for each type of protocol, for example, requirement head fields corresponding to http protocol can be OPTIONS, GET, HEAD, POST, PUT, DELETE, TRACE and so on. Preferably, a POST requirement head field can be used, which is shown as below particularly:

```
<?xml version="1.0" encoding="gb2312"?>
<!—Trade information-!>
<TradeInfo>
    <AccountInfo name="To"><!—account name transferred in-!>
        <AccountName>Zhang San</AccountName><!—Account name transferred in-!>
        <AccountValue>4367420037465985234</AccountValue><!— account value transferred in-!>
        <!—bank information transferred in--!>
        <BankInfo>
            <BankName>beijing branch</BankName><!—Beijing branch of the bank-!>
        </BankInfo>
    </AccountInfo>
    <AccountInfo name="From">
        <AccountName>Li Si</AccountName><!—Account name transferred out-!>
        <AccountValue>4367420074923372387</AccountValue><!—account value transferred out-!>
        <!—Bank information transferred out--!>
        <BankInfo>
            <BankName> Shanghai branch</BankName><!—Branch transferred out-!>
        </BankInfo>
    </AccountInfo>
    <TradeData>
        <TradeMoney>134.22</TradeMoney>        <!—Transferred number-->
        <TradeType>1</TradeType>               <!—Trade type-->
        <MoneyType>2</MoneyType>               <!—Money type-->
        <TradeTime>20090206152645</TradeTime>  <!—Trade time-->
        <OtherData></OtherData>                <!--others-->
    </TradeData>
    <SignatureData>
    </SignatureData>
</TradeInfo>
```

Three types of information, input by the user is predetermined as the critical information in transfer, that is account name transferred in, account transferred in, account value transferred in, corresponding to Zhang San, 4367420037465985234 and 134.22 in the above example, with the following critical information identification code:

```
<AccountName>Zhang San</AccountName>  <!—Account name transferred in-!>
<AccountValue>4367420037465985234</AccountValue>  <!—Account value transferred in-!>
<TradeMoney>134.22</TradeMoney>       <!—Trade value->
```

In the above identification, <AccountName> and </AccountName> identify the account name transferred in; <AccountValue> and </AccountValue> identify the account transferred in; <TradeMoney> and </TradeMoney> identify the account value transferred in; and the proxy server and the application server of the bank can determine whether critical information is included in the protocol content by the above critical information identification, and can locate the critical information.

POST/transfer.cgi HTTP/1.1\r\n
Host: 219.168.0.1\r\n
Content-Length: 512\r\n\r\n
Protocol content entity in format of POST=XML In the above requirement head field, HTTP/1.1 refers to http 1.1 protocol, and /transfer.cgi refers to the program used for the bank server to process an online trade, 219.168.0.1 refers to the server address visited, and 512 refers to the length of the protocol message, followed the requirement head field is the protocol content entity in XML format.

Step 104: after the proxy server receives the protocol message, it parses the protocol message according to the predetermined protocol and deletes the requirement head field and obtains the protocol content.

The method for deleting the requirement head field is contrary to that in step 103, in details is that the POST requirement head field is deleted according to the http protocol content and the protocol content entity in XML format in step 102 is gotten.

Step 105: the proxy server parses the protocol content received and determines whether the critical information is included in the protocol content predetermined by the proxy server, the smart key device and the application server, if it is, step 106 is executed, otherwise, step 107 is executed.

Two methods can be used for the proxy server to determine whether a critical information is included in the protocol content, one is that the proxy server locates the field predetermined by a negotiation between the proxy server, the smart key device and the application server in the protocol content, and determines whether there is data in this field, if there is, it determines that the critical information is included in the protocol content, otherwise, it determines that the critical information is not included;

another is that the proxy server determines whether a critical information identification, predetermined by the proxy server, the smart key device and the application server, is included in the protocol content, if it is, the proxy server determines that the critical information is included in the protocol content; otherwise, the proxy server determines that the critical information is not included in the protocol content.

For example, the proxy server determines whether the critical information identification <AccountName> and </AccountName> is included in the protocol content, if it is, the proxy server reads data between <AccountName> and </AccountName> and obtains the account name transferred in; and further determines whether the critical information identification <AccountValue> and </AccountValue> is included in the protocol content, if it is, the proxy server reads data between <AccountValue> and </AccountValue> and obtains the account value transferred in; and further determines whether the critical information identification <TradeMoney> and </TradeMoney> is included in the protocol content, if it is, the proxy server reads data between <TradeMoney> and </TradeMoney> and obtains TradeMoney critical information transferred in. If any of the three critical information identification predetermined by the proxy server, the smart key device and the application server, is not empty (that is, there is data therein), the proxy server determines the critical information is included in the protocol content, and if all the three critical information is empty (that is, there is no data therein), the proxy server determines that the critical information is not included in the protocol content.

Step 106: the proxy server sends the received protocol message to the application server, which refers to the online bank server in the embodiment, and communicates with the application server and the customer terminal of the proxy server, and steps are over.

Step 107: the proxy server sends the protocol content to the USB Key, and the USB Key parses the protocol after receiving it and obtains the critical information and outputs it for user's confirmation.

In order to further improve security of network and prevent attacks from a phishing site, before the proxy server sends the protocol content to the USB Key, in the step, it authenticates the address of the application server in the requirement head field, in details that the proxy server parses the received protocol message and obtains the requirement head field, and determines whether the address of the application server in the requirement head field matches that prestored address in the proxy server, if it does, the proxy server sends the protocol to the USB Key; otherwise, it prompts the user of an error in the application server and the process is over. In the example, the host address in the requirement head field can be extracted to compare with the prestored online bank application server's address of proxy server.

Addresses of many application servers can be prestored in the proxy server, and for safer, it can be prestored after an encryption.

Two methods can be used by the USB Key for parsing the protocol content to obtain the critical information, one is that the USB Key finds the field, predetermined by a negotiation between the proxy server, the smart key device and the application server, in the protocol content, and determines whether there is data in the field, if there is, the USB Key reads the data and obtains the critical information;

another is that the USB Key determines whether a critical information identification, predetermined by the proxy server, the smart key device and the application server, is included in the protocol content, if it is, the USB Key reads the critical information according to the critical information identification.

The USB Key can output the critical information by LCD display, or by voice broadcast, for user's confirmation. The USB Key can convert the critical information to a standard format and output it, for example, after the account number of 4367420037465985234, the account name of Zhang San and the trade value of 134.22 transferred in are gotten by the USB Key, the critical information is outputted for user's confirmation by display as Account number: 4367420037465985234
Account name: Zhang San
Trade value: 134.22

Step 108: the USB Key receives the user's confirmation information and determines whether the critical information is correct or not, if it is, the step 109 is executed, otherwise if it is not or the USB Key does not receive the confirmation information within a predetermined time period, the step 112 is executed.

The predetermined time period is a time period left for the user to input the confirmation information, and only the confirmation information within the time period is valid, if the user inputs the confirmation information over the time period, it will be taken invalid.

Step 109: the USB Key signs the protocol content and sends the signature result to the proxy server.

In details, before USB Key signs the protocol content, it authenticates the user's identification by the user's biometric features such as PIN (personal identification number), or fingerprints or iris, or vein features and so on, and in the embodiment, the PIN authentication is used which in details that the USB Key prompts the user of inputting a PIN code by display or voice broadcast, and the user inputs the PIN code with the keyboard in the USB Key, and the USB Key receives the PIN code and authenticates whether it is correct or not, if it is, the USB Key signs the protocol content and sends the signature result to the proxy server; otherwise, the USB Keys prompts the user of inputting the PIN code again or stops all operation.

Further the PIN authentication of the USB Key can be replaced with that the USB Key sends a requirement for authenticating the PIN to the customer terminal software, and the customer terminal software prompts the user of inputting a PIN and receives a PIN input by a user and sends it to the USB Key, and the USB Key determines whether the PIN is correct or not after reviewing it, if it is, the USB Key signs the protocol content and sends the signature result to the proxy server, otherwise, the USB Key prompts the user of inputting the PIN again or stopping all operations.

In this embodiment of the invention, the USB Key can authenticate the PIN once only at the beginning of online trade, or once before each signature.

Moreover, the USB Key can choose to sign all or part of the protocol content when signing the protocol content. For example, the USB Key only signs the critical information of the protocol content, referring to the above mentioned account number 4367420037465985234, account name Zhang San and account value 134.22 with preferred Hash algorithm, and obtains the signature result:

" MualIO9msIOE1IuIiH22Z8N57PzagkURnlxUgknTTXi88t+9u1Tzg0ltcYZWdG+D3LOgD
XfejPtjx01HSt293usQhRTt5SW8qte24lUvw0eMC0YHzH3Iwu0Jb5KErXrsg0OMWFZMnhbjF33p
GloQWMC23pe6Z98XCcnKR3nqBdY="。

Step 110: the proxy server receives the signature result, and generates a new protocol content according to the signature result and the protocol, and sends the new protocol message to the application server. The new protocol message generated by the proxy server can be that the proxy server inserts the signature result, sent by the USB Key, to the protocol content in XML format in step 102, and obtains a new protocol content in XML format by a combination, and adds a new requirement head field to the new protocol content and obtains the new protocol message. The inserted signature result can be converted with base64 coding method, and in the embodiment the signature result is inserted in the <SignatureData></SignatureData> field as below:

```
<SignatureData>
    MualIO9msIOE1IuIiH22Z8N57PzagkURnlxUgknTTXi88t+9u1Tzg0ltcYZWdG+D3LOgDXfe
jPtjx01HSt293usQhRTt5SW8qte24lUvw0eMC0YHzH3Iwu0Jb5KErXrsg0OMWFZMnhbjF33pGlo
QWMC23pe6Z98XCcnKR3nqBdY=
</SignatureData>
```

The new head field added can be:
POST/transfer.cgi HTTP/1.1\r\n
Host:www.domain.com\r\n
Content-Length: 528\r\n\r\n
POST=the new protocol content in XML format The insertion of the signature results in a change of the protocol message in length, while the POST and host are still the same as before, and the message behind the requirement head field changes from the protocol content in XML format in step 102, to the new one in XML format in the step.

Besides the above method for inserting the signature result, the proxy server can replace the signature result with a designated part in the protocol content and obtains new protocol content, and adds a new requirement head field to the new protocol content and obtains the new protocol message. The designated part is predetermined by the proxy server, which is part or all of the protocol content, for example, data in the designated field <SignatureData></SignatureData> of the protocol content can be replaced with the signature result. Wherein, the customer terminal software can insert a fault signature result to the field and use it as the initial value when generating protocol content, and the proxy server replaces the signature result returned from the USB Key, with the fault signature result and obtains a new protocol content when generating a new protocol.

Step 111: after the application server receives the new protocol message, it parses and authenticates the signature in the protocol message for customer terminal, and after a successful authentication, it makes online transfer and ends all operations.

Step 112: the USB Key makes exception handling, and ends all operations.

The method for exception handling includes steps that the USB Key refuses to sign the protocol content and notifies the proxy server of stopping all operations and prompts the user of an error, or the USB Key returns a fault signature result to the proxy server which will lead to a trade failure.

In the embodiment, the USB Key can also do not output the critical information for user's confirmation after receiving it, but signs the protocol content and returns the signature result to the proxy server, and the proxy server generates a new protocol message according to the signature result and the protocol content and sends it to the application server.

In the embodiment, the step 106 can be replaced with the follow steps for safer: the proxy server sends the protocol content to the USB Key, and the USB Key signs the protocol content and returns the signature result to the proxy server, and the proxy server generates a new protocol according to the signature result and the protocol content (inserted or replaced with), and adds a new requirement head field to it to obtain a new protocol message and sends the new protocol message to the application server; and then the application server parses the new protocol message after receiving it and authenticates the signature in the message and serves the customer terminal after a successful authentication.

Embodiment 2

A system for improving network application security is provided in the embodiment, including a proxy server 1 and a smart key device 2.

The proxy server 1 is installed in the customer terminal host, including an interface module 11 for receiving a protocol message generated and sent by a customer terminal software according to the information input by a user, and communicating with the smart key device 2, and sending the protocol content to the smart key device 2, and receiving a signature result from smart key device 2, and sending the new protocol message to the application server;

a parsing module 12 for parsing the protocol message received by the interface module 11, and obtaining the protocol content;

a determining module 13 for determining whether a critical information, predetermined by the proxy server 1, the smart key device 2 and the application server, is included in the protocol content, if it is, sending the protocol content to the smart key device 2 with the interface module 11; otherwise sending the protocol message to the application server with the interface module 11;

and a message generating module 14 for generating a new protocol message according to the signature result received by the interface module 11 and the protocol content gotten by the parsing module 12, and sending the protocol message to the application server with the interface module 11;

the smart key device 2 includes an interface module 21 for communicating with the proxy server 1, and receiving the protocol content sent by the proxy server 1, and sending a signature result to the proxy server 1;

a filtering module 22 for parsing the protocol content received by the interface module 21 and obtaining the critical information;

a outputting module 23 for outputting the critical information, received by the filtering module 22, for user's confirmation;

a confirmation module 24 for receiving the confirmation signal, of whether the critical information is correct or not, input by the user;

a signature module 25 for signing the protocol content received by the interface module 21, after the signal received by the confirmation module 24 is a confirmation signal of the correction of the critical information, and returning the signature result to the proxy server 1 with the interface module 21;

and an exception handling module 26 for making an exception handling after the signal received by the confirmation module 24 is the confirmation signal of the error of the critical information or the confirmation signal is not received within a predetermined time period by the confirmation module 24.

In the embodiment, the determining module 13 of the proxy server 1 includes a first determining unit for finding the designated field predetermined by the proxy server 1, the smart key device 2 and the application server, in the protocol content gotten by a parsing module 12 and determining whether there is data in the field, if there is, determining that a critical information is included in the protocol content and sending the protocol content to the smart key device 2 with the interface module 11; otherwise, determining that a critical information is not included in the protocol content and sending the protocol message to the application server with the interface module 11; or a second determining unit for determining whether a critical information identification, predetermined by the proxy server 1, the smart key device 2 and the application server, is included in the protocol content acquired by the parsing module 12, if it is, determining that a critical information is included in the protocol content and sending the protocol content to the smart key device 2 with the interface module 11; otherwise determining that the critical information is not included in the protocol content and sending it to the application server with the interface module 11.

In the embodiment, both the protocol message and the new protocol message include a requirement head field, in which an address of the application server is recorded; correspondingly, the determining module 13 further includes a determining unit for determining whether the critical information predetermined by the proxy server 1, the smart key device 2 and the application server, is included in the protocol content gotten by the parsing module 12;

a first processing unit for parsing the requirement head field of the protocol message received by the interface module 11 of the proxy server 1, when the determining module determines that the critical information is included in the protocol content, and for determining whether address of the application server recorded in the requirement head field matches that stored in the proxy server 1, if it does, sending the protocol content to the smart key device 2 with the interface module 11 of the proxy server; otherwise, prompting the user of an error information;

and a second processing unit for sending the protocol content to the application server with the interface module 11 after the determining module determines that the critical information is not included in the protocol.

In the embodiment, the filtering module 22 of the smart key device 2 further includes a first filtering unit for finding the field predetermined by the proxy server 1, the smart key device 2 and the application server, in the protocol content received by the interface module 21, and for determining whether there is data in the field; if there is, reading data in the field and obtaining the critical information; or a second filtering unit for determining whether the critical information identification, predetermined by the proxy server 1, the smart key device 2 and the application server, is included in the protocol content received by the interface module 21, if it is, finding the critical information according to the critical information identification.

In the embodiment, the outputting module 23 of the smart key device 2 can be a LCD display or an audio device.

In the embodiment, the exception handling module 26 of the smart key device 2 further includes a first exception handling unit for notifying the proxy server 1 of stopping all operations with the interface module 21 and prompting the user of the failure, after the information received by the confirmation module 24 is confirmed uncorrect by the user, or the confirmation information from the user is not received by the confirmation module within a predetermined time period;

or a second exception handling unit for returning an fault signature result to the proxy server 1 with the interface module 21 after the information received by the confirmation module 24 is confirmed uncorrect by the user, or the confirmation information from the user is not received by the confirmation module within a predetermined time period.

In the embodiment, the interface module 11 of the proxy server 1 is further used for sending the protocol message to the application server after the determining module 13 determines that the critical information is not included in the protocol content.

In the embodiment, the signature module 25 of the smart key device 2 further includes a signature unit for authenticating the user's identification according to his personal identification code or his personal biometrics after the signal received by the confirmation module 24 is a signal confirmed correct by the user; and after a successful authentication to the user's identification, signing the protocol content received by the interface module 21 of the smart key device 2 and returning the signature result to the proxy server 1 with the interface module 21 of the smart key device 2; otherwise, after a unsuccessful authentication to the user's identification, refusing to sign the protocol content. The personal biometrics includes fingerprints, iris, or vein.

In the embodiment, the message generating module 14 of the proxy server 1 further includes a first generating unit for inserting the signature result received by the interface module 11 of the proxy server 1, into the protocol content and obtaining new protocol content, and adding a requirement head field to the new protocol content and obtaining a new protocol message, and sending the new protocol message to the application server with the interface module 11 or a second generating module for replacing the signature result received by the interface module 11 of the proxy server 1, with the designated part of the protocol content and obtaining new protocol content, and adding a requirement head field to the new protocol content and obtaining a new protocol message, and sending the new protocol message to the application server with the interface module 11.

The solution provided in the embodiments of the invention is executed by determining whether the critical information is included in the protocol message with a proxy server of the customer terminal server, if it is, the USB Key signs the protocol content and returns the signature result to the proxy server, and the proxy server generates a new protocol message to the application server according to the signature result, which improves network application security on the premise of no change in the customer terminal, usable and compatible.

The above-mentioned is only the preferred embodiments of the invention, not a limit to the invention, and all modifications, changes and substitutions in the principle of the invention should be protected by the invention.

The invention claimed is:

1. A method for improving network application security, wherein the method comprising:
    a proxy server in a customer terminal host receiving a protocol message generated and sent by customer terminal software according to information input by a user, parsing the protocol message according to a predetermined protocol, and obtaining protocol content, wherein the proxy server is software installed in the customer terminal host; and
    the proxy server determining whether critical information, which is predetermined by the proxy server, a smart key device and an application server, is included in the protocol content;
        upon determining that the critical information is included in the protocol content, the proxy server sending the protocol content to the smart key device and the smart key device parsing the protocol content to obtain the critical information, and outputting the critical information for user's confirmation;
        determining whether the critical information is confirmed correct by the user; and
        upon determining that the critical information is confirmed correct by the user, the smart key device signing the protocol content and returning a signature result to the proxy server, and then the proxy server generating a new protocol message according to the signature result and the protocol content, and sending it to the application server, wherein the new protocol message is obtained by adding a new requirement head field to a second protocol content, wherein the second protocol content is obtained by inserting the signature result into the protocol content; or
        upon determining that the critical information is not confirmed correct by the user within a predetermined time period, the smart key device performing an exception handling;
    upon determining that the critical information is not included in the protocol content, the proxy server sending the protocol message to the application server, wherein the step of the proxy server determining whether critical information, which is predetermined by the proxy server, the smart key device and the application server, is included in the protocol content, comprises:
        the proxy server finding the field predefined by the proxy server, the smart key device and the application server, in the protocol content, determining whether there is data in the field, upon determining that there is, determining that the critical information is included in the protocol content; or
        the proxy server determining whether a critical information identification, predetermined by the proxy server, the smart key device and the application server, is included in the protocol content, upon determining that it is, the proxy server determining that the critical information is included in the protocol content,
    wherein both the protocol message and the new protocol message comprise a requirement head field, in which the address of the application server is recorded,
    wherein the step of the proxy server sending the protocol content to the smart key device further comprises:
    the proxy server parsing the requirement head field of the protocol message and determining whether the address of the application server in the requirement head field matches with an address of the application server stored in the proxy server, upon determining that it does, the proxy server sending the protocol content to the smart key device; upon determining that it does not, the proxy server prompting the user of an error in the application server, and the procedure being completed.

2. The method for improving network application security of claim 1, wherein the step of the smart key device parsing the protocol content and obtaining the critical information in the protocol content, comprises:
    the smart key device obtaining the field predefined by the proxy server, the smart key device and the application server, in the protocol content, and determining whether there is data in the field, upon determining that there is, the smart key device reading the data and obtaining the critical information; or the smart key device determining whether a critical information identification predetermined by the proxy server, the smart key device and the application server, is included in the protocol content, upon determining that it is, the smart key device obtaining the critical information with the critical information identification.

3. The method for improving network application security of claim 1, wherein the step of outputting the critical information for user's confirmation comprises: the smart key device outputting the critical information for user's confirmation by a LCD display or voice broadcast.

4. The method for improving network application security of claim 1, wherein the step of the smart key device performing an exception handling comprises: the smart key device notifying the proxy server of stopping all operations and prompting the user of an operation failure; or the smart key device returning a fault signature result to the proxy server.

5. The method for improving network application security of claim 1, wherein the step of the smart key device signing the protocol content comprises:
    the smart key device authenticating a user's identification according to his personal identification code or personal biometrics, wherein, the personal biometrics comprise fingerprints, iris or vein identification; and
    signing the protocol content after a successful authentication or refusing to sign the protocol content after a authentication failure.

6. The method for improving network application security of claim 1, wherein the step of the proxy server generating a new protocol message according to the signature result and the protocol content, comprises:
    the proxy server inserting the received signature result to the protocol content and obtaining a new protocol content, and adding a requirement head field to the new protocol content to obtain a new protocol message; or the proxy server replacing the designated part of the protocol content with the received signature result to obtain a new protocol content, adding a requirement head field to the new protocol content, and obtaining a new protocol message.

7. The method for improving network application security of claim 1, wherein the predetermined protocol comprises the Hypertext Transfer Protocol and/or the Hypertext Transfer Protocol over Secure Socket Layer.

8. A system for improving network application security, wherein the system comprising:

a smart key device;

a customer terminal host, comprising a first processor and first memory; and a proxy server, wherein the proxy server is software installed in the customer terminal host;

wherein the proxy server comprises a plurality of first program modules stored on the first memory, wherein the plurality of first program modules are configured to be executed by the first processor, the plurality of first program modules comprising:

a first interface module for receiving a protocol message generated and sent by customer terminal software according to information input by a user, for communicating with the smart key device, for sending a protocol content to the smart key device, and for receiving a signature result from the smart key device and sending a new protocol message to the application server, wherein the new protocol message is obtained by adding a new requirement head field to a second protocol content, wherein the second protocol content is obtained by inserting the signature result into the protocol content;

a parsing module for parsing the protocol message received by the first interface module and obtaining the protocol content;

a determining module for determining whether critical information, predetermined by the proxy server, the smart key device and the application server, is included in the protocol content gotten by the parsing module, upon determining that it is, sending the protocol content to the smart key device with the first interface module; otherwise sending the protocol to the application server with the first interface module; and a message generating module for generating a new protocol message with the signature result received by the first interface module and the protocol content gotten by the parsing module, and for sending the new protocol message to the application server with the first interface module;

wherein the smart key device comprises a second processor, second memory, and a plurality of second program modules stored on the second memory, wherein the plurality of second program modules are configured to be executed by the second processor, the plurality of second program modules comprising:

a second interface module for communicating with the proxy server and receiving the protocol content sent by the proxy server, and for sending the signature result to the proxy server;

a filtering module for parsing the protocol content received by the second interface module and obtaining the critical information;

an outputting module for outputting the critical information gotten by the filtering module for user's confirmation;

a confirmation module for receiving the confirmation signal, of whether the critical information is correct or not, input by the user;

a signature module for signing the protocol content received by the second interface module while the signal received by the confirmation module is confirmed correct by the user, and for returning the signature result to the proxy server with the second interface module of the smart key device; and an exception handling module for making exception handling upon determining that the signal received by the confirmation module is a signal confirmed incorrect by the user, or upon determining that the signal sent by the user is not received by the confirmation module within a predetermined time period, wherein the determining module further comprises:

a first determining unit for finding the field predetermined by the proxy server, the smart key device and the application server, in the protocol content received by the parsing module, and for determining whether there is data in the field or not, upon determining that there is, determining the critical information is included in the protocol content and sending the protocol content to the smart key device with the first interface module; otherwise, determining the critical information is not included in the protocol content and sending the protocol message to the application server with the first interface module; or a second determining unit for determining whether the critical information identification, predetermined by the proxy server, the smart key device and the application server, is included in the protocol content received by the parsing module, upon determining that it is, determining the critical information is included in the protocol content and sending the protocol content to the smart key device with the first interface module; otherwise, determining the critical information is not included in the protocol content and sending the protocol message to the application server with the first interface module, wherein both the protocol message and the new protocol message comprise the requirement head field in which an address of the application server is recorded, and the determining module further comprises:

a determining unit for determining whether the critical information, predetermined by the proxy server, the smart key device and the application server, is included in the protocol content gotten by the parsing module;

a first processing unit for parsing the requirement head field in the protocol message received by the first interface module of the proxy server upon determining that the determining module determines that the critical information is included in the protocol content, and for determining whether the address of the application server recorded in the requirement head field matches with an address of the application server stored in the proxy server, upon determining that it does, sending the protocol content to the smart key device with the first interface module of the proxy server; otherwise, prompting the user of an error in the application server; and a second processing unit for sending the protocol message to the application server with the first interface module after the determining module determining that the critical information is not included in the protocol content.

9. The system for improving network application security of claim 8, wherein the filtering module further comprises: a first filtering unit for finding the field predetermined by the proxy server, the smart key device and the application server, in the protocol content received by the second interface module of the smart key device, and for determining whether there is data in the field, upon determining that there is, reading the data and obtaining the critical information; or a second filtering unit for determining whether a critical information identification predetermined by the proxy server, the smart key device and the application server, is included in the protocol content received by the second interface module of the smart key device, upon determining that it is, obtaining the critical information according to the critical information identification.

10. The system for improving network application security of claim 8, wherein the outputting module is a LCD display or an audio device.

11. The system for improving network application security of claim 8, wherein the exception handling module further comprises a first exception handling unit for notifying the proxy server of stopping all operations and prompting the user of a failure after the information received by confirmation module is information that the user confirms the critical information incorrect, or the confirmation information from the user is not received by the confirmation module within a predetermined time period; or a second exception handling unit for returning a fault signature result to the proxy server with the second interface module of the smart key device after the information received by confirmation module is information that the user confirms the critical information incorrect, or the confirmation information from the user is not received by the confirmation module within a predetermined time period.

12. The system for improving network application security of claim 8, wherein the signature module of the smart key device further comprises: a signature unit for authenticating the user's identification by his personal identification code or personal biometrics which include fingerprints, iris or vein, upon determining that the signal received by the confirmation module is a signal that the user confirms the critical information correct, and for signing the protocol content and returning the signature result to the proxy server with the second interface module of the smart key device after a successful authentication; or for refusing to sign the protocol content after a failed authentication.

13. The system for improving network application security of claim 8, wherein the message generating module of the proxy server comprises a first generating unit for inserting the signature result, received by the first interface module of the proxy server, to the protocol content and obtaining a new protocol content, and for adding a requirement head field to the new protocol content and obtaining a new protocol message, and for sending the new protocol message to the application server with the first interface module or a second generating unit for replacing the signature result, received by the first interface module of the proxy server, with the designated part of the protocol content and obtaining new protocol content, and for adding a requirement head field to the new protocol content and obtaining a new protocol message, and for sending the new protocol message to the application server with the first interface module.

\* \* \* \* \*

UNITED STATES PATENT AND TRADEMARK OFFICE
CERTIFICATE OF CORRECTION

PATENT NO.        : 8,719,915 B2                                     Page 1 of 1
APPLICATION NO.   : 12/808166
DATED             : May 6, 2014
INVENTOR(S)       : Zhou Lu et al.

It is certified that error appears in the above-identified patent and that said Letters Patent is hereby corrected as shown below:

On the Title Page, item (73), delete "Assignee: ZTE Corporation, Shenzhen, Guangdong Province (CN)" and insert --Assignee: FEITIAN TECHNOLOGIES CO., LTD., Beijing (CN)--.

Signed and Sealed this
Twenty-ninth Day of December, 2015

Michelle K. Lee
*Director of the United States Patent and Trademark Office*